United States Patent
Shioya et al.

(10) Patent No.: US 11,965,902 B2
(45) Date of Patent: Apr. 23, 2024

(54) AUTOMATIC ANALYSIS DEVICE

(71) Applicant: Hitachi High-Technologies Corporation, Tokyo (JP)

(72) Inventors: Kei Shioya, Tokyo (JP); Hiroki Akase, Tokyo (JP); Rei Konishi, Tokyo (JP); Masaaki Sakaguchi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 559 days.

(21) Appl. No.: 16/644,627

(22) PCT Filed: Jan. 23, 2019

(86) PCT No.: PCT/JP2019/001967
§ 371 (c)(1),
(2) Date: Mar. 5, 2020

(87) PCT Pub. No.: WO2019/176298
PCT Pub. Date: Sep. 19, 2019

(65) Prior Publication Data
US 2021/0080478 A1    Mar. 18, 2021

(30) Foreign Application Priority Data
Mar. 15, 2018 (JP) ................................ 2018-047434

(51) Int. Cl.
*G01N 35/02* (2006.01)
*G01N 35/00* (2006.01)

(52) U.S. Cl.
CPC ... *G01N 35/02* (2013.01); *G01N 2035/00396* (2013.01)

(58) Field of Classification Search
None
See application file for complete search history.

(56) References Cited

U.S. PATENT DOCUMENTS

| 5,946,358 A | 9/1999 | Saito |
| 5,948,258 A * | 9/1999 | Daugherty ........... B01D 21/283 210/208 |

(Continued)

FOREIGN PATENT DOCUMENTS

| EP | 0 825 444 A2 | 2/1998 |
| JP | 55-97570 U | 7/1980 |

(Continued)

OTHER PUBLICATIONS

International Search Report of PCT/JP2019/001967 dated Mar. 26, 2019.

(Continued)

*Primary Examiner* — Benjamin R Whatley
*Assistant Examiner* — Curtis A Thompson
(74) *Attorney, Agent, or Firm* — MATTINGLY & MALUR, PC

(57) ABSTRACT

When washing the inside of a reactor vessel which is used repeatedly, a rough suction is performed before suctioning with a washing tip; however, unwanted washing liquid may remain that may affect analysis results. The present invention provides an automatic analysis device for analyzing a sample using light, in which the automatic analysis device is characterized in that: a washing mechanism comprises a washing liquid supply nozzle that supplies washing liquid to a reactor vessel after analysis, a washing liquid suction nozzle that suctions the supplied washing liquid, a washing tip provided to the bottom end of the washing liquid suction nozzle, and a rough suction nozzle that suctions, in advance, a liquid within the reactor vessel before suctioning with the washing tip; and after the rough suction, liquid is caused to remain so that the bottom surface of the reactor vessel is not exposed.

7 Claims, 11 Drawing Sheets

(56) References Cited

U.S. PATENT DOCUMENTS

| | | | | |
|---|---|---|---|---|
| 2002/0037239 | A1* | 3/2002 | Komatsu | B01L 3/0275 422/400 |
| 2004/0139868 | A1* | 7/2004 | Arai | B41J 2/17559 101/119 |
| 2005/0014274 | A1* | 1/2005 | Lee | G01N 35/0092 134/30 |
| 2005/0106718 | A1* | 5/2005 | Balasubramanian | G01N 1/02 435/283.1 |
| 2008/0101990 | A1* | 5/2008 | Liu | B01L 13/02 422/63 |
| 2011/0243791 | A1* | 10/2011 | Kanayama | G01N 35/025 422/62 |
| 2015/0125940 | A1* | 5/2015 | Oguro | G01N 35/04 422/63 |
| 2017/0043346 | A1* | 2/2017 | Welch | B65D 25/24 |
| 2019/0351424 | A1* | 11/2019 | Shioya | B01L 13/02 |
| 2020/0064364 | A1* | 2/2020 | Ito | G01N 35/04 |
| 2021/0041472 | A1* | 2/2021 | Limbach | G01N 21/253 |

FOREIGN PATENT DOCUMENTS

| | | | | |
|---|---|---|---|---|
| JP | S5597570 | U * | 7/1980 | B08B 11/00 |
| JP | 08-220102 | A | 8/1996 | |
| JP | 10-062431 | A | 3/1998 | |
| JP | 2002-98706 | A | 4/2002 | |
| JP | 2003-107095 | A | 4/2003 | |
| JP | 2003107095 | A * | 4/2003 | B08B 9/20 |
| JP | 2015210206 | A * | 11/2015 | |
| WO | 2018/155300 | A1 | 8/2018 | |

OTHER PUBLICATIONS

Extended European Search Report received in corresponding European Application No. 19768411.1 dated May 7, 2021.

Chinese Office Action received in corresponding Chinese Application No. 201980004351.0 dated Dec. 5, 2023.

* cited by examiner

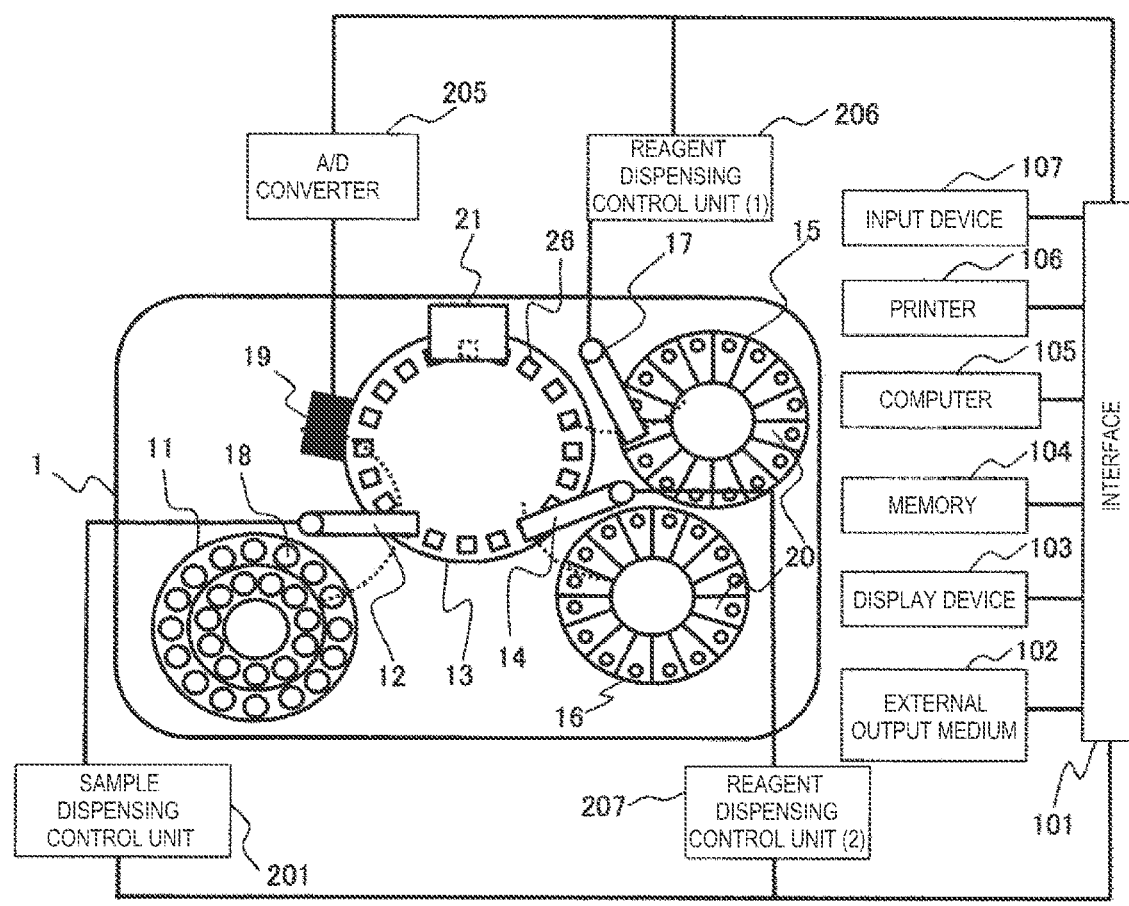
[FIG. 1]

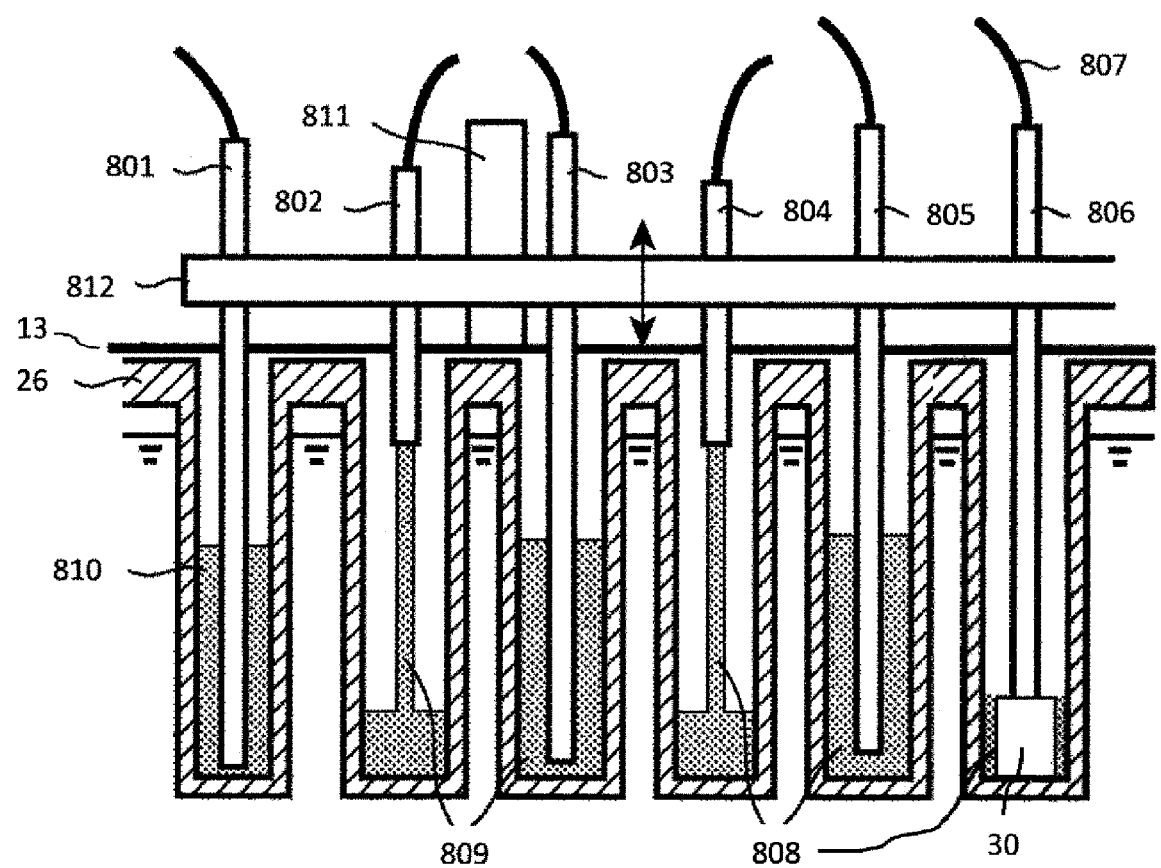
[FIG. 2]

[FIG. 3]
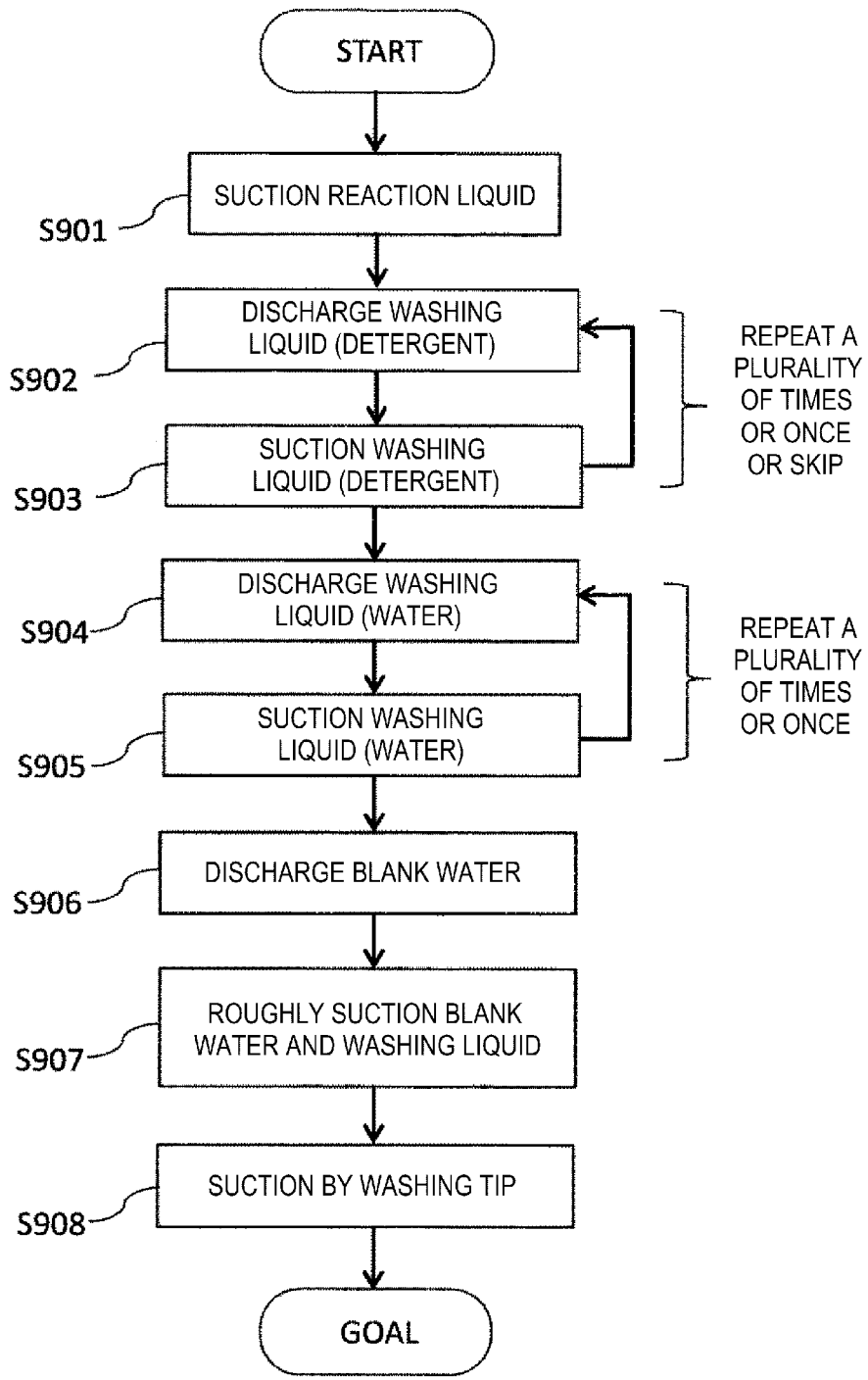

[FIG. 4]
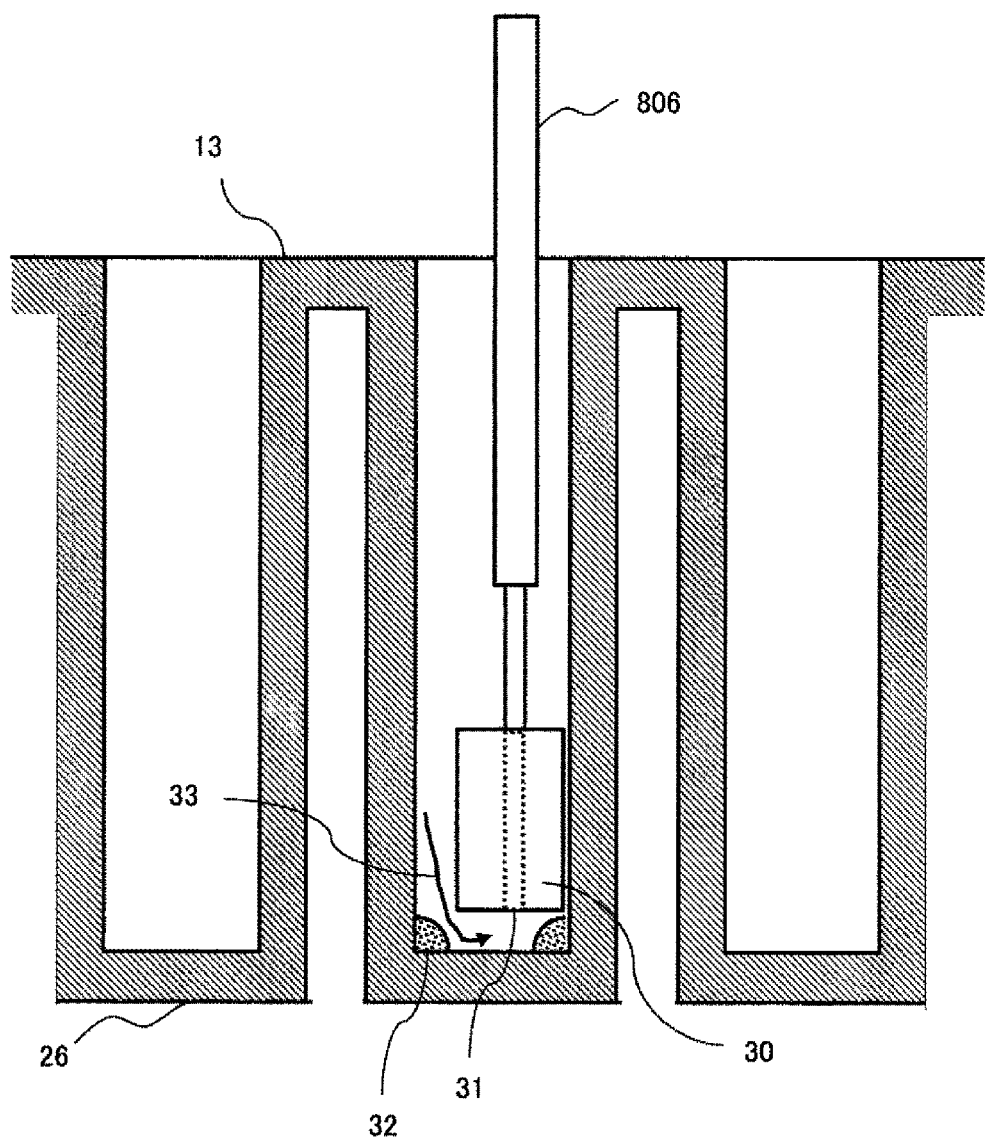

[FIG. 5]
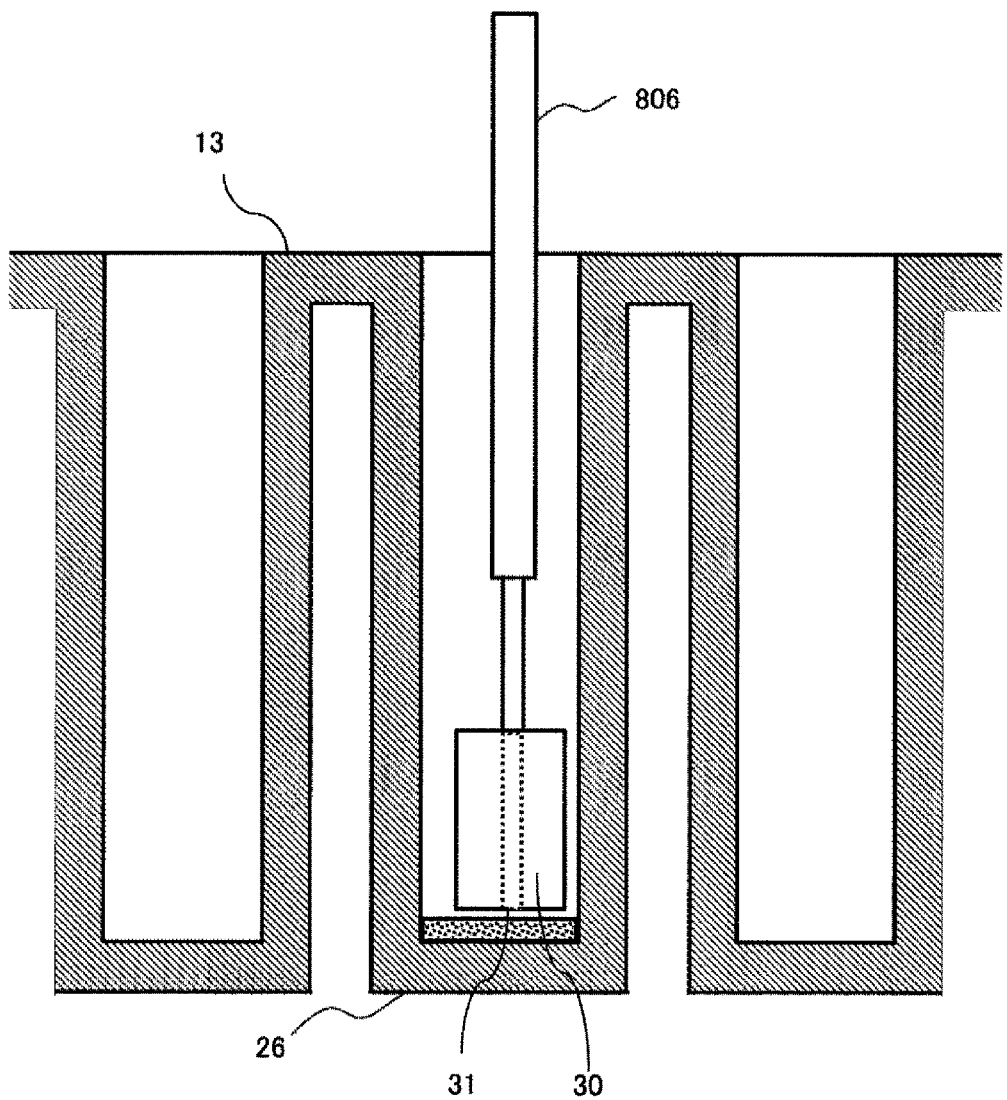

[FIG. 6]
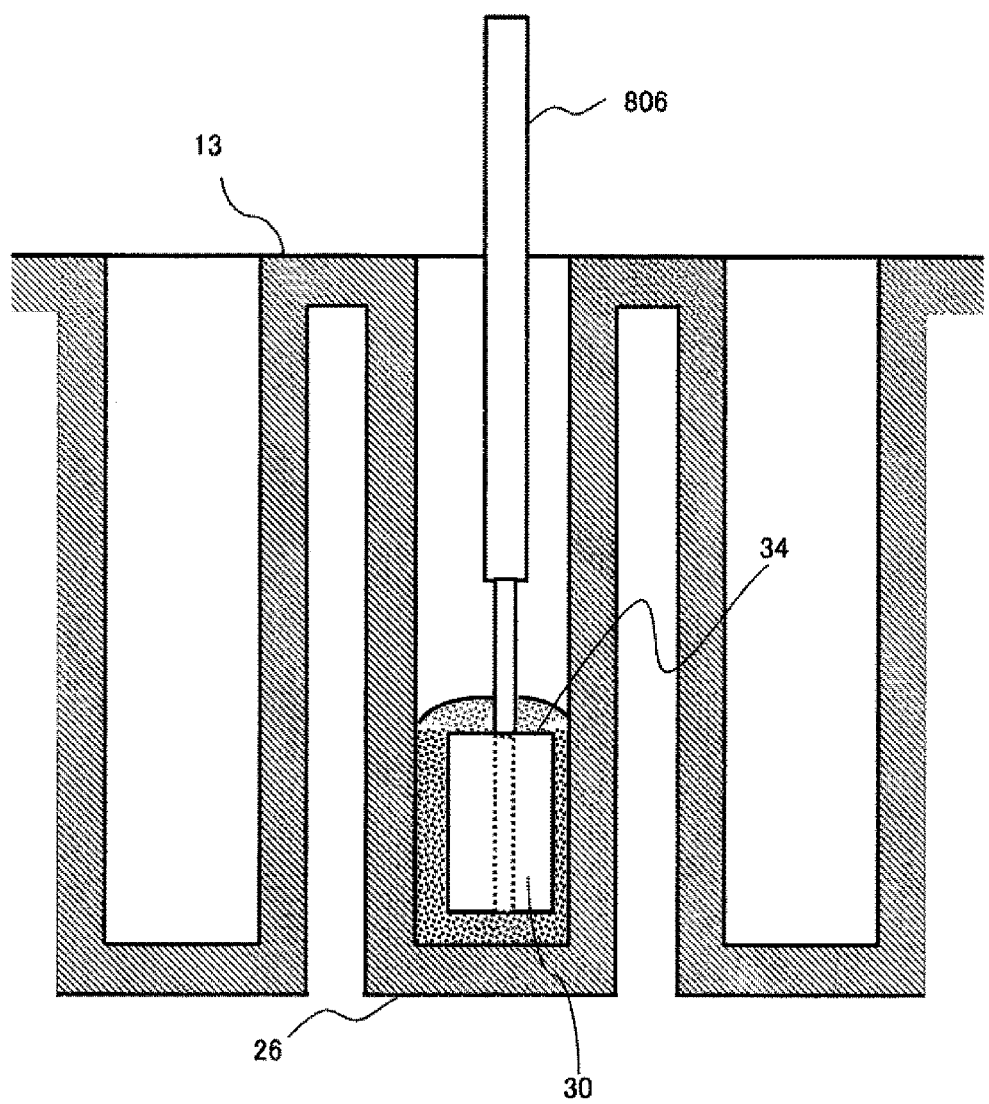

[FIG. 7]
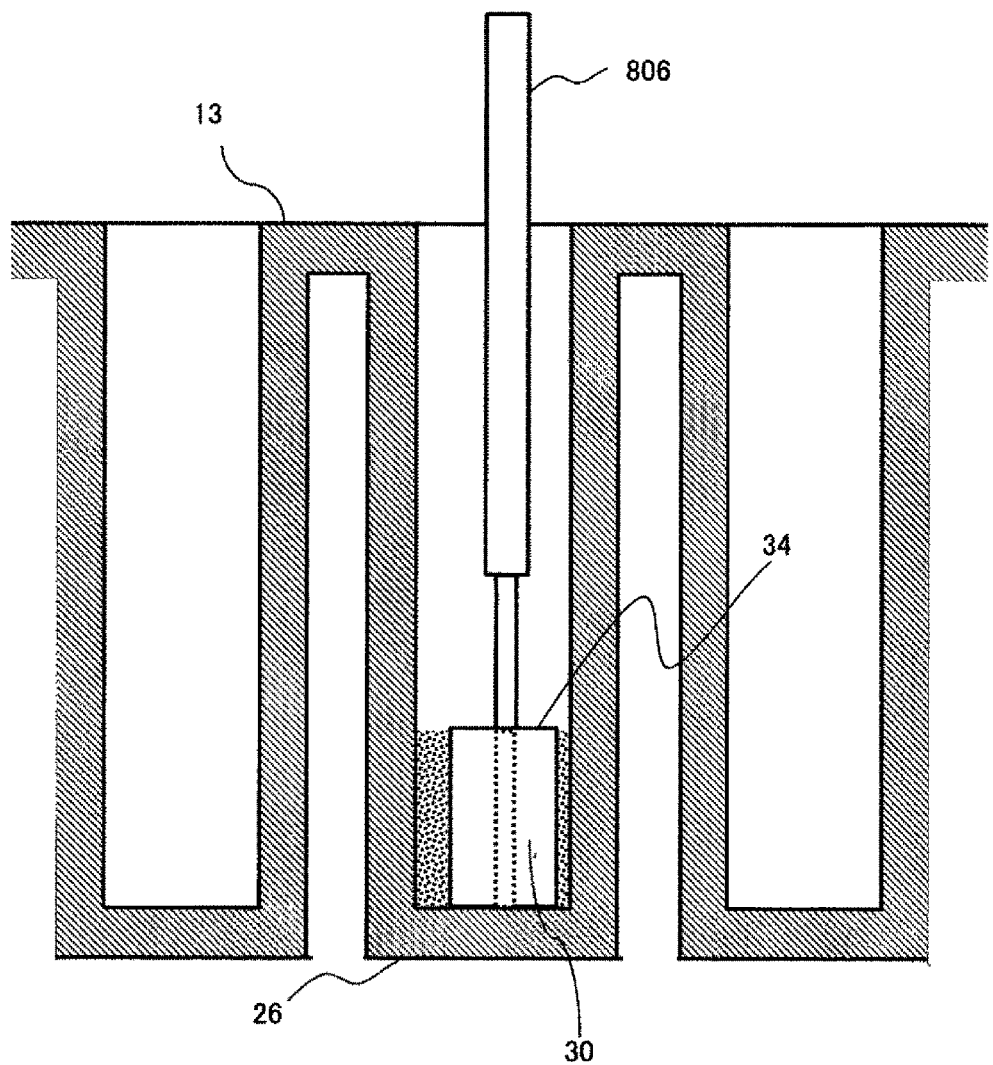

[FIG. 8]
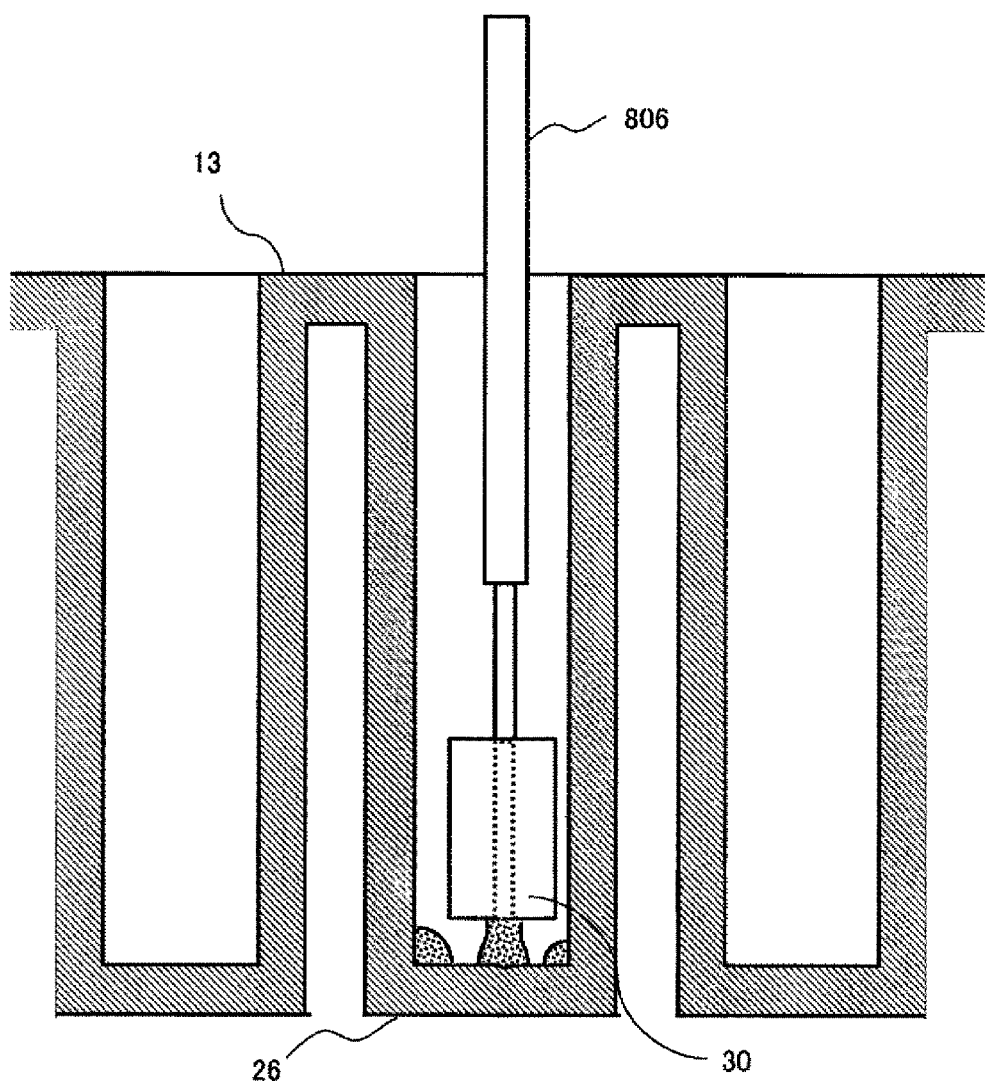

[FIG. 9]
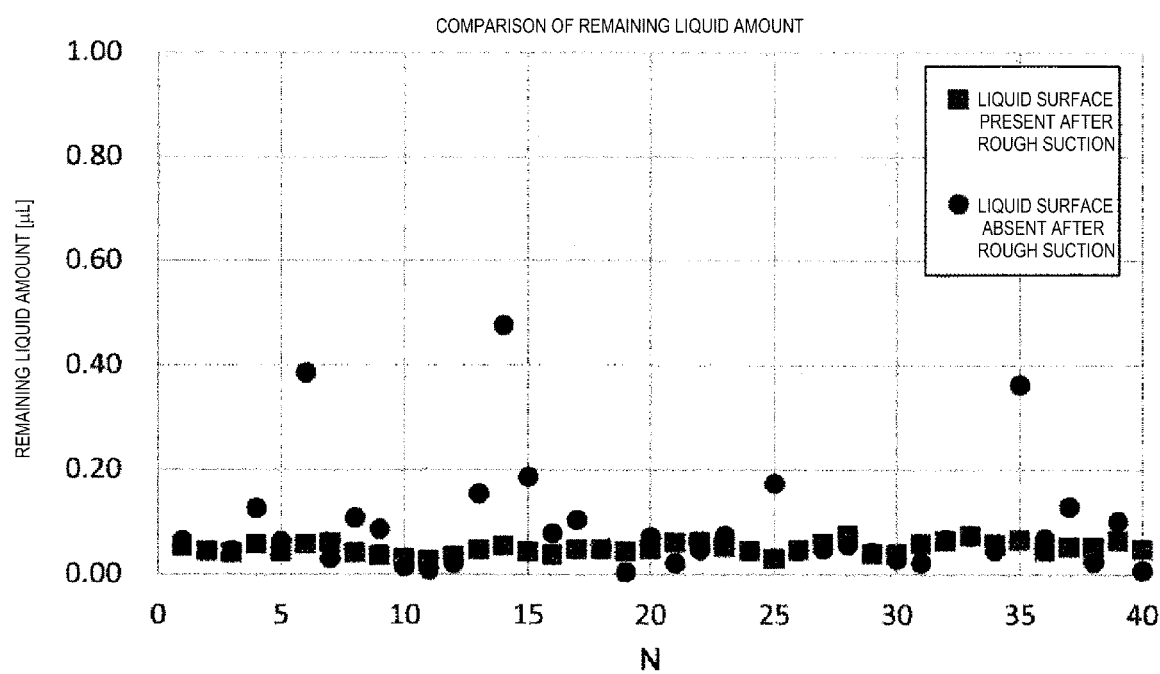

[FIG. 10]
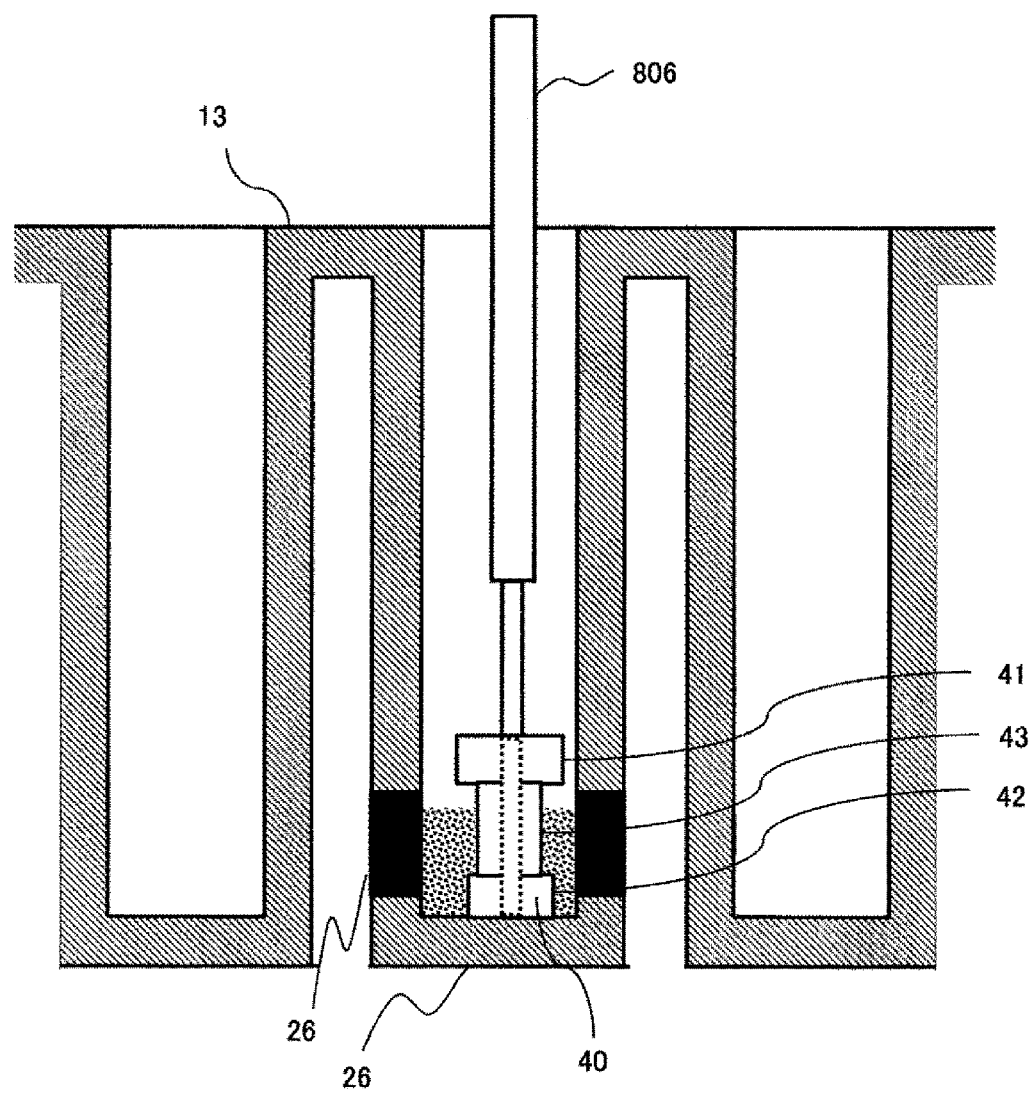

[FIG. 11]
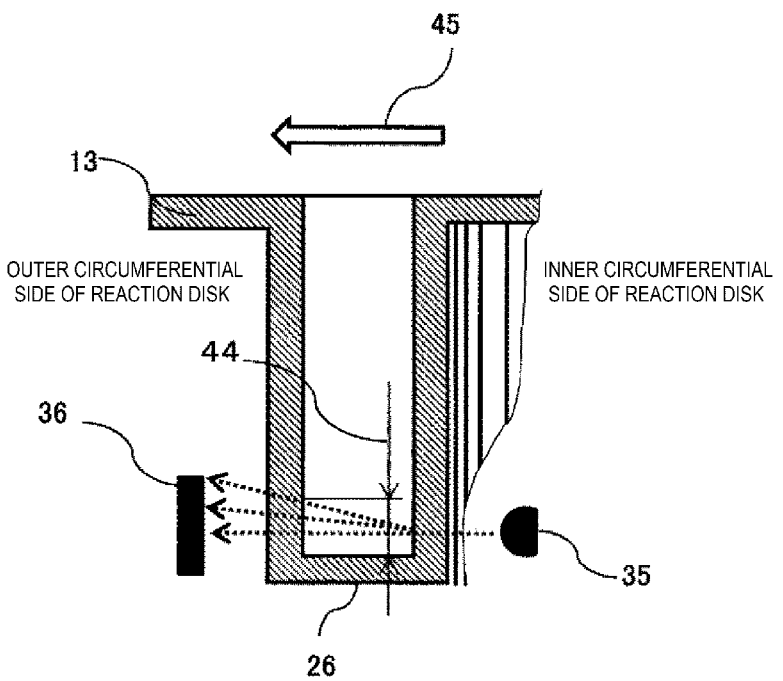

AUTOMATIC ANALYSIS DEVICE

TECHNICAL FIELD

The present invention relates to an automatic analysis device for analyzing a biological sample such as blood and urine, and particularly relates to an automatic analysis device which includes a washing mechanism for washing a reactor vessel.

BACKGROUND ART

An automatic analysis device is a device which qualitatively analyzes a biological sample (hereinafter, sometimes referred to as a sample) such as blood or urine. The sample and a reagent are reacted in a reactor vessel to analyze a component of a measured object in the sample. The reactor vessel is formed of a material such as plastic or glass, and in particular, in a device which analyzes items such as a biochemical analysis, the reactor vessel used for one measurement is commonly washed and used repeatedly. A washing operation of the reactor vessel includes: moving the reactor vessel to a predetermined washing position, repeatedly injecting and suctioning a washing liquid such as a detergent or a washing water, and finally suctioning the liquid in the reactor vessel and ending the washing. At this time, if the remaining liquid remains in the reactor vessel after the washing, the next analysis result is affected.

As a technique for preventing the remaining liquid such as the washing liquid from remaining in the reactor vessel, in Patent Literature 1, a suction member (hereinafter, sometimes referred to as a washing tip) having a shape along an inner wall of the reactor vessel is attached to a tip end of a nozzle. The remaining liquid can be reduced by reducing a cross-sectional area of a gap between the washing tip and the inner wall of the reactor vessel (hereinafter, sometimes referred to as clearance) as much as possible as compared with a cross-sectional area of an inner hole of the washing tip.

CITATION LIST

Patent Literature

PTL 1: JP-A-10-062431

SUMMARY OF INVENTION

Technical Problem

In the automatic analysis device, it is increasingly demanded to simplify a mechanism for reducing a size of the device, increase the number of processing tests, and improve reliability of the analysis result. Further, as an analysis method of the automatic analysis device, it is general that the liquid in which the biological sample and the reagent are mixed is irradiated with a light from an outside of the reactor vessel, and that a concentration or the like of the component of the measured object is calculated by detecting the transmitted and scattered light. Therefore, in a case where the remaining liquid such as a reaction liquid or the washing liquid of a previous measurement is present in the reactor vessel washed and used repeatedly, the following measurement may be affected.

In the above-described Patent Literature 1, the clearance between the reactor vessel and the washing tip is reduced to reduce the remaining liquid. However, in order to insert the washing tip into the reactor vessel, it is necessary to provide a certain clearance in consideration of stopping accuracy and an individual difference in the size of the washing tip. When the washing tip is inserted into the reactor vessel in a manner biased to one side, there is a concern that the clearance may be larger on one side and droplets may not be suctioned.

In view of the above problems, an object of the invention is to realize a highly accurate and reliable analysis by reducing a remaining liquid as much as possible regardless of a position and a size of a washing tip.

Solution to Problem

One aspect for solving the above problems provides an automatic analysis device including: a reactor vessel; a reaction disk configured to hold the reactor vessel; a sample dispensing mechanism configured to dispense a sample into the reactor vessel; a reagent dispensing mechanism configured to dispense a reagent into the reactor vessel; an optical system including a light source configured to emit light onto a mixture of the sample and the reagent dispensed into the reactor vessel, and a detector configured to detect the light emitted from the light source; and a washing mechanism configured to wash the reactor vessel. The automatic analysis device is configured to analyze the sample based on the light detected by the detector. The washing mechanism includes: a washing liquid supply nozzle configured to supply a washing liquid to the reactor vessel after the analysis; a washing liquid suction nozzle configured to suction the supplied washing liquid; a washing tip-equipped washing liquid suction nozzle including a washing tip on a bottom end of the nozzle; and a rough suction nozzle configured to suction, in advance, the liquid within the reactor vessel before suctioning with the washing tip. After rough suction of the rough suction nozzle, the liquid is caused to remain so that a bottom surface of the reactor vessel is not exposed.

Advantageous Effect

According to the above aspect, the liquid is caused to remain so that the bottom surface of the reactor vessel is not exposed due to the rough suction nozzle for suctioning the liquid such as the washing liquid before suctioning with the washing tip, such that a remaining liquid after washing can be reduced regardless of a position of the washing tip. Therefore, affection on the analysis due to thinning of the sample and the reagent due to the remaining liquid of the washing liquid is reduced, and it is possible to contribute to realization of a highly accurate and reliable analysis.

BRIEF DESCRIPTION OF DRAWINGS

FIG. 1 is a diagram showing a basic configuration of an automatic analysis device according to an embodiment.

FIG. 2 is a diagram showing an entire configuration of a washing mechanism according to the present embodiment.

FIG. 3 is a flowchart showing a washing operation according to the present embodiment.

FIG. 4 is a conceptual diagram showing a state of suction when a droplet is caused to remain in a reactor vessel and a position of a washing tip shifts according to the present embodiment.

FIG. 5 is a conceptual diagram showing a state of suction when a liquid surface is formed on a bottom of the reactor vessel according to the present embodiment (Embodiment 1).

FIG. 6 is a conceptual diagram showing an example in which a liquid amount after rough suction is too large and the liquid surface exceeds a washing tip upper surface at the time of suction with the washing tip according to the present embodiment (Embodiment 1).

FIG. 7 is a conceptual diagram showing an upper limit of the liquid amount after rough suction according to the present embodiment (Embodiment 1).

FIG. 8 is a conceptual diagram showing a state in which the liquid surface is interrupted and a droplet is formed when a suction speed is high according to the present embodiment (Embodiment 1).

FIG. 9 is a diagram showing a comparison of a remaining liquid amount after washing depending on presence or absence of the liquid surface after rough suction according to the present embodiment.

FIG. 10 is a conceptual diagram showing a state at the time of suction with an I-shaped washing tip according to an embodiment (Embodiment 2).

FIG. 11 is a diagram showing a configuration example of a light source and a detector of a photometer according to the present embodiment.

DESCRIPTION OF EMBODIMENTS

Hereinafter, embodiments of the invention will be described in detail with reference to the drawings.

Throughout the whole, in the drawings, each component having the same function is denoted by the same reference numeral in principle, and a description thereof may be omitted.

Embodiment 1

<Entire Configuration of Device>

FIG. 1 is a diagram showing a basic configuration of an automatic analysis device according to an embodiment. Here, as an aspect of the automatic analysis device, an example of a turntable type biochemical analysis device will be described.

As shown in this diagram, the automatic analysis device 1 includes a reaction disk 13, a sample disk 11, a first reagent disk 15, a second reagent disk 16, a photometer 19, and a washing mechanism 21 which are disposed on a housing body.

The reaction disk 13 is a disk-shaped unit which is rotatable in a clockwise direction and a counterclockwise direction, and a plurality of reactor vessels 26 can be arranged on a circumference thereof.

The sample disk 11 is a disk-shaped unit which is rotatable in the clockwise direction and the counterclockwise direction, and a plurality of sample vessels 18 containing biological samples such as standard samples and test samples can be arranged on the circumference thereof.

The first reagent disk 15 and the second reagent disk 16 are disk-shaped units which are rotatable in the clockwise direction and the counterclockwise direction, and a plurality of reagent vessels 20 which contain reagents containing components that react with components of each examination item included in a sample can be arranged on the circumference thereof. Further, although not shown in the drawing, the first reagent disk 15 and the second reagent disk 16 can be provided with a cold storage mechanism or the like, so that the reagents in the arranged reagent vessels 20 can also be configured to be capable of keeping cold.

A sample dispensing probe 12 is disposed between the reaction disk 13 and the sample disk 11, and the sample dispensing probe 12 is disposed so as to be capable of suctioning and dispensing samples in the reactor vessels 26 on the reaction disk 13 and the sample vessels 18 on the sample disk 11 by a rotation operation of the sample dispensing probe 12.

Similarly, a first reagent dispensing probe 17 is disposed between the reaction disk 13 and the first reagent disk 15, and a second reagent dispensing probe 14 is disposed between the reaction disk 13 and the second reagent disk 16. According to respective rotation operations, dispensing operations such as suction and discharge in the reactor vessels 26 on the reaction disk 13 and the reagent vessels 20 on the first reagent disk 15 and the second reagent disk 16 can be performed.

The photometer 19 is, for example, disposed as described later with reference to FIG. 11, such that the detector 36 is located on an outer circumferential side and the light source 35 is located on an inner circumferential side of the reactor vessels 26 which are provided in the reaction disk 13, and can perform photometry on a transmitted light, a scattered light, or the like of a liquid in the reactor vessel 26.

The washing mechanism 21 includes a reaction liquid suction nozzle 801, a washing liquid suction nozzle 803, a rough suction nozzle 805, and a washing tip-equipped washing liquid suction nozzle 806, which will be described later with reference to FIG. 2, at a position that does not interfere with the sample dispensing probe 12, the first reagent dispensing probe 17, where the washing mechanism 21 can be inserted into the reactor vessel 26 provided in the reaction disk 13.

Next, a control system and a signal processing system according to the automatic analysis device 1 will be briefly described. A computer 105 is connected to a sample dispensing control unit 201, a reagent dispensing control unit (1) 206, a reagent dispensing control unit (2) 207, and an A/D converter 205 via an interface 101, and transmits a signal which is a command to each control unit.

The sample dispensing control unit 201 controls the dispensing operation of the samples by the sample dispensing probe 12 based on the command received from the computer 105.

In addition, the reagent dispensing control unit (1) 206 and the reagent dispensing control unit (2) 207 control the dispensing operation of the reagents by the first reagent dispensing probe 17 and the second reagent dispensing probe 14 based on the command received from the computer 105.

A photometric value of the transmitted light or the scattered light of the reaction liquid in the reactor vessels 26, which is converted into a digital signal by the A/D converter 205, is taken into the computer 105.

The interface 101 is connected to a printer 106 that prints when a measurement result is output as a report, a memory 104 which is a storage device, an external output medium 102, an input device 107 such as a keyboard for inputting an operation command or the like, and a display device 103 that displays a screen. The display device 103 includes, for example, a liquid crystal display, or a CRT display, or the like.

Here, a basic operation of the automatic analysis device 1 will be described.

First, an operator requests an examination item for each sample by using the input device 107 such as the keyboard. In order to analyze the sample for the requested examination item, the sample dispensing probe 12 dispenses a predetermined amount of the sample from the sample vessels 18 to the reactor vessels 26 in accordance with an analysis parameter. The reactor vessels 26 to which the sample is dispensed are transferred by rotation of the reaction disk 13, and stop at a reagent receiving position. Nozzles of the first reagent dispensing probe 17 and the second reagent dispensing probe 14 dispense predetermined amounts of reagent liquids into the reactor vessels 26 in accordance with the analysis parameter of the corresponding examination item. As for a dispensing order of the sample and the reagents, the reagents may precede the sample as opposed to the example.

Thereafter, the sample and the reagents are agitated by an agitating mechanism (not shown) and mixed.

When one of the reactor vessels 26 crosses a photometric position, the photometry is performed on the transmitted light and the scattered light of the reaction liquid by the photometer. The photometrically measured transmitted light and the scattered light are converted into data having a numerical value proportional to a light amount by the A/D converter 205, and is taken into the computer 105 via the interface 101.

By using the converted numerical value, concentration data is calculated based on a calibration curve measured previously by an analysis method designated for each examination item. Component concentration data as an analysis result of each examination item is output to the printer 106 and the screen of the display device 103. Before the measurement operation described above is performed, the operator sets various parameters necessary for the analysis and registers the reagents and the sample via an operation screen of the display device 103. Further, the operator confirms the analysis result after the measurement by using the operation screen on the display device 103.

<Configuration of Washing Mechanism>

Next, an entire configuration and a washing operation of the washing mechanism according to the present embodiment will be respectively described with reference to FIGS. 2 and 3.

First, as shown in FIG. 2, the washing mechanism 21 mainly includes the reaction liquid suction nozzle 801 for suctioning a reaction liquid 810, a washing liquid discharge nozzle 802 for discharging a washing liquid 809, the washing liquid suction nozzle 803 for suctioning the washing liquid, a blank water discharge nozzle 804 for discharging a blank water 808, the rough suction nozzle 805 for roughly suctioning the blank water 808 and the washing liquid used so far, the washing tip-equipped washing liquid suction nozzle 806 for suctioning a liquid remaining after the rough suction, tubes 807 connected to each nozzle, a nozzle jig 812 where each nozzle is provided, and an up-down support shaft 811 for moving each nozzle upward and downward.

Next, washing steps performed via the rough suction according to the present embodiment will be described in more detail. FIG. 3 is a flowchart showing the washing operation according to the present embodiment. When an analysis operation is being performed, tip ends of the nozzles 801, 802, 803, 804, 805, and 806 are located above an opening portion of the reactor vessel 26. After completing the above measurement, the reactor vessel 26 used for the measurement is moved to a washing position of the washing mechanism 21 by the rotation of the reaction disk 13, and after the reaction liquid is suctioned (step S901), the washing liquid such as an alkaline detergent, an acid detergent, or a washing water is discharged and suctioned according to washing conditions (steps S902 to S905). Therefore, the liquid in the reactor vessel 26 is replaced with the washing liquid from the reaction liquid. Here, the steps S902 and S903 may be repeated a plurality of times or once in accordance with the washing condition, and a case where the washing capable of being performed only by the washing water may also be skipped. Further, the steps S904 and S905 can be repeated a plurality of times or once in accordance with the washing condition.

At this time, it is desirable to measure contamination of the reactor vessel 26 used for the measurement after the replacement with the washing liquid, and to generate an alarm requesting a replacement of the reactor vessel 26 when a certain threshold is exceeded. Therefore, after the step S905 is completed, the blank water 808 is discharged into the reactor vessel 26 (step S906), and the contamination is measured by absorbance or the like. When it is confirmed that the contamination of the reactor vessel 26 is lower than the threshold, the blank water 808 is roughly suctioned by the rough suction nozzle 805 (step S907), and finally, the liquid in the reactor vessel 26 is suctioned by the washing tip-equipped washing liquid suction nozzle 806 (step S908), so that the reactor vessel 26 can be used for the next measurement.

As described above, it is known that a remaining liquid can be reduced by making a clearance between the washing tip 30 and the reactor vessel 26 as small as possible. However, if a suction force is weakened due to the tube being torn or clogged, or if a dropping speed of the washing tip-equipped washing liquid suction nozzle 806 is high, the smaller the clearance, the higher the possibility that the liquid in the reactor vessel 26 will overflow. Therefore, before the suction of the washing tip-equipped washing liquid suction nozzle 806, the possibility of overflow can be reduced by previously and roughly suctioning the liquid in the reactor vessel 26 with the rough suction nozzle 805.

It is easy to imagine that it is effective in reducing the remaining liquid after completing the washing by reducing a liquid amount to be suctioned by the washing tip-equipped washing liquid suction nozzle 806 as much as possible by rough suction. However, as shown in FIG. 4, when roughly suctioning until the droplets 32 are caused to remain at four corners of a bottom of the reactor vessel 26, it is conceivable that an air flow path 33 is formed between a suction port of a washing tip end 31 and the droplets 32 depending on a position and individual differences in sizes due to a tolerance of the washing tip 30, and an unexpected remaining liquid is generated since more air than the droplets 32 is suctioned. In order to tighten a dimensional tolerance of the washing tip 30 or reduce an error of a stopping position of the reactor vessel 26, the above can be realized by improving stopping accuracy of the reaction disk 13 or the like. However, manufacturing becomes difficult due to an increased cost and a complicated structure.

Therefore, as shown in FIG. 5, after the rough suction of the washing mechanism 21 of the automatic analysis device 1 according to the present embodiment, the suction port of the washing tip end 31 contacts a liquid surface by leaving a liquid amount enough to form the liquid surface, such that a bottom surface of the reactor vessel 26 is not exposed, and the liquid can be suctioned integrally without remaining the droplets 32 at the four corners due to a surface tension. As a method for forming the liquid surface after the rough suction, for example, a method is used in which a length of the rough suction nozzle 805 is shortened such that a tip end of the nozzle does not contact the bottom of the reactor vessel 26 after the nozzle drops. Alternatively, a method may be used in which the stopping timing of the suction is controlled, such that the liquid remains as the bottom surface of the reactor vessel 26 is not exposed.

If the liquid amount after the rough suction is too large, when the washing tip 30 drops for suction, the dropping speed of the liquid surface cannot catch up the washing tip 30, and the washing tip 30 is immersed in the liquid. In some cases, the liquid surface rises corresponding to a volume amount of the washing tip 30 and the liquid overflows, and the liquid fall on a washing tip upper surface 34 (FIG. 6). Therefore, as shown in FIG. 7, the liquid amount is required such that regardless of how much the washing tip 30 enters the liquid surface, the liquid does not fall on the washing tip upper surface 34. Alternatively, a method is also conceivable in which an air hole is formed in the washing tip upper surface 34 from near the suction port of the washing tip end 31, so as to suction the liquid falling on the upper surface.

Further, if a suction speed of the washing tip-equipped washing liquid suction nozzle 806 is too high, a force exceeding the surface tension of the water is applied, so that there is a possibility that the water is broken and the droplets 32 are caused to remain (FIG. 8). Therefore, it is necessary to control an appropriate suction speed.

FIG. 9 shows remaining liquid amounts after suctioning with the washing tip-equipped washing liquid suction nozzle 806, when the suction is performed by the rough suction nozzle 805 such that the droplets 32 are caused to remain at the four corners (a liquid surface is absent after the rough suction), and when the liquid amount is caused to remain after the rough suction such that the bottom surface of the reactor vessel 26 is not exposed (a liquid surface is present after the rough suction). It can be seen from FIG. 9 that when the liquid surface is caused to remain by the rough suction, the remaining liquid amount is smaller on average, and a variation in the remaining liquid amount is also smaller. Accordingly, it can be seen that it is more beneficial to perform the rough suction in which the liquid amount that does not expose the bottom surface of the reactor vessel 26 is caused to remain, rather than performing the rough suction as much as possible before suctioning by the washing tip-equipped washing liquid suction nozzle 806.

According to the above configuration, the liquid amount that does not expose the bottom surface of the reactor vessel 26 is caused to remain by the rough suction, so that the remaining liquid can be reduced regardless of the position and the individual differences in the sizes of the washing tip 30, and reliability of an analytical performance of the device can be improved. At this time, if the rough suction is performed by the washing liquid suction nozzle 803, the number of nozzles does not need to be increased, and the effect can be realized without complicating the configuration of the device.

Embodiment 2

Next, another shape of the washing tip 30 of the automatic analysis device 1 according to the present embodiment will be described. In Embodiment 1 described above, a case where an appearance of the washing tip 30 is formed by a simple rectangular parallelepiped has been shown and described. Here, a rectangular parallelepiped 41 formed with a maximum width on an upper portion of the washing tip 30, a rectangular parallelepiped 42 formed with a smaller width than that of the upper portion on a lower portion of the washing tip 30, and a rectangular parallelepiped 43 formed with a minimum width between the upper portion and the lower portion are stacked (hereinafter, sometimes referred to as an I shape), and the above will be described with reference to FIG. 10. FIG. 10 is a conceptual diagram showing a state at the time of suction with an I-shaped washing tip 40 according to an embodiment (Embodiment 2).

In an example shown in this diagram, as described above, the I-shaped washing tip 40 includes the rectangular parallelepiped 41 formed with the maximum width (cross-sectional area) on the upper portion, the rectangular parallelepiped 42 with the width (cross-sectional area) smaller than that of the upper portion of the rectangular parallelepiped on the lower portion, and the rectangular parallelepiped 43 with the minimum width (cross-sectional area) between the upper portion and the lower portion. That is, a clearance between a side wall of the upper portion of the I-shaped washing tip 40 and a side wall of the reactor vessel 26 is minimum, and a clearance between a side wall of a portion between the upper portion and the lower portion of the I-shaped washing tip 40 and the side wall of the reactor vessel 26 is maximum.

Due to the shape, below the upper portion of the I-shaped washing tip 40, a volume is smaller than that of a simple rectangular parallelepiped, and even when the liquid amount after the rough suction varies and is increased due to differences among the devices, a possibility of overflow and a possibility of liquid is on the washing tip upper surface 34 can be reduced, so that likelihood of a liquid amount range can be improved. Further, since it is difficult for the liquid to overflow or to fall on the washing tip upper surface 34, even when the dropping speed of each nozzle of the washing mechanism 21 increases as the number of processing tests of the device increases, a high speed can be realized without any problem. Further, by arranging the rectangular parallelepiped between the upper portion and the lower portion and the rectangular parallelepiped of the lower portion which have a reduced width in a photometry range 44 of the reactor vessel 26, a portion in contact with an inner wall of the reactor vessel 26 is only the rectangular parallelepiped 41 on the upper portion of the washing tip and is outside the photometry range, and a configuration that can improve the reliability of the analysis without damaging the photometry range 44 can be realized. Here, the photometry range 44 indicates a range in a height direction. In the present embodiment, a direction of a light emitted from the light source 35 and transmitted and scattered lights which is described later with reference to FIG. 11 is a direction from a surface side toward a back side of FIG. 10. That is, the light is emitted in a radial direction 45 from the inner circumferential side to the outer circumferential side of the reaction disk 13, and the photometry is performed by the detector 36 shown in FIG. 11 which is provided on the outer circumferential side. Further, contrary to the example, the light source 35 also can be disposed on the outer circumferential side and the detector 36 also can be disposed on the inner circumferential side of the reaction disk 13.

In this configuration, a shape that is I-shaped when viewed from only one direction is described, but a shape that is also an I shape when viewed from the other direction may be used. According to the shape, likelihood of an upper limit range of the liquid amount can be further improved.

REFERENCE SIGN LIST

1: automatic analysis device
11: sample disk
12: sample dispensing probe
13: reaction disk
14: second reagent dispensing probe
15: first reagent disk
16: second reagent disk
17: first reagent dispensing probe
18: sample vessel
19: photometer 20: reagent vessel
21: washing mechanism
26: reactor vessel
30: washing tip
31: suction port of washing tip end
32: droplet
33: air flow path during droplet formation
34: washing tip upper surface
35: light source
36: detector
40: I-shaped washing tip
41: rectangular parallelepiped formed with maximum width on upper portion of I-shaped washing tip
42: rectangular parallelepiped formed with smaller width than that of upper portion
43: rectangular parallelepiped formed with minimum width between upper portion and lower portion
44: photometry range of reactor vessel
45: radial direction of reaction disk (from inner circumference to outer circumference)
101: interface
102: external output medium
103: display device
104: memory
105: computer
106: printer
107: input device
201: sample dispensing control unit
205: A/D converter
206: reagent dispensing control unit (1)
207: reagent dispensing control unit (2)
801: reaction liquid suction nozzle
802: washing liquid discharge nozzle
803: washing liquid suction nozzle
804: blank water discharge nozzle
805: rough suction nozzle
806: washing tip-equipped washing liquid suction nozzle
807: tube
808: blank water
809: washing liquid
810: reaction liquid
811: up-down support shaft
812: nozzle jig

The invention claimed is:

1. An automatic analysis device comprising:
a reactor vessel;
a reaction disk configured to hold the reactor vessel;
a sample dispensing mechanism configured to dispense a sample into the reactor vessel;
a reagent dispensing mechanism configured to dispense a reagent into the reactor vessel;
an optical system including a light source configured to emit light into a mixture of the sample and the reagent dispensed into the reactor vessel, and a detector configured to detect the light emitted from the light source;
a washing mechanism configured to wash the reactor vessel; and
a computer,
wherein the computer is programmed to analyze the sample based on the light detected by the detector,
wherein the washing mechanism includes:
 a washing liquid supply nozzle configured to supply a washing liquid to the reactor vessel after the analysis;
 a washing liquid suction nozzle configured to suction the supplied washing liquid;
 a washing tip-equipped washing liquid suction nozzle provided with a washing tip on a bottom end of the washing tip-equipped washing liquid suction nozzle; and
 a rough suction nozzle that has a shorter length than the washing tip-equipped washing liquid suction nozzle,
wherein the washing tip includes three or more regions having different cross-sectional areas, including an upper portion, a lower portion, and an intermediate portion located between the upper portion and the lower portion, the cross-sectional area of the intermediate portion being the least among the upper portion, the lower portion, and the intermediate portion, and the cross-sectional area of the lower portion being greater than the cross-sectional area of the intermediate portion and less than the cross-sectional area of the upper portion,
wherein the computer is programmed to:
control the rough suction nozzle to suction liquid in the reactor vessel such that a portion of the liquid remains in the reactor vessel so a bottom surface of the reactor vessel is not exposed, and
after the rough suction nozzle suctions the liquid in the reactor vessel, control the washing tip-equipped washing liquid suction nozzle provided with the washing tip to suction the portion of the liquid remaining in the reactor vessel,
wherein each of the upper portion, the lower portion, and the intermediate portion of the washing tip is configured as a rectangular parallelepiped structure, and
wherein the washing liquid suction nozzle extends completely through the washing tip, and a portion of the washing liquid suction nozzle that extends completely through the washing tip has a uniform diameter.

2. The automatic analysis device according to claim 1, wherein the portion of the liquid remaining in the reactor vessel suctioned by the washing tip-equipped washing liquid suction nozzle is a blank water.

3. The automatic analysis device according to claim 1, wherein the washing mechanism includes:
a nozzle jig configured to hold the washing liquid supply nozzle, the washing liquid suction nozzle, the washing tip-equipped washing liquid suction nozzle, and the rough suction nozzle; and
a support shaft configured to move the washing liquid supply nozzle, the washing liquid suction nozzle, the washing tip-equipped washing liquid suction nozzle, and the rough suction nozzle upward and downward.

4. The automatic analysis device according to claim 1, wherein at a suction position of the rough suction nozzle, a tip end of the rough suction nozzle is above the bottom surface of the reactor vessel.

5. The automatic analysis device according to claim 1, wherein the computer is programmed to control the suction by the rough suction nozzle to stop after a certain time such that the bottom surface of the reactor vessel is not exposed.

6. The automatic analysis device according to claim 1, wherein the portion of the liquid that remains in the reactor vessel after suctioning by the rough suction nozzle is an amount such that a liquid surface of the portion of the liquid that remains is not above the washing tip upper surface when the washing tip-equipped washing liquid suction nozzle is lowered in a suction position.

7. The automatic analysis device according to claim 1, wherein the rectangular parallelepiped structure on the upper portion has the maximum cross-sectional area, and the rectangular parallelepiped structure on the lower portion has a smaller cross-sectional area than the rectangular parallelepiped structure on the upper portion.

\* \* \* \* \*